Nov. 26, 1963   T. N. CROOK   3,112,397
INTERPRETATION OF GEOPHYSICAL DATA
Filed April 3, 1958

INVENTOR.
TROY N. CROOK,
BY John B. Davidson
ATTORNEY.

United States Patent Office 3,112,397
Patented Nov. 26, 1963

3,112,397
INTERPRETATION OF GEOPHYSICAL DATA
Troy N. Crook, Bellaire, Tex., assignor, by mesne assignments, to Jersey Production Research Company, Tulsa, Okla., a corporation of Delaware
Filed Apr. 3, 1958, Ser. No. 726,109
10 Claims. (Cl. 235—181)

This invention relates to the interpretation of geophysical data, and more particularly to apparatus for correlating a multiplicity of seismogram traces to derive useful geophysical information therefrom.

In prospecting for subterranean deposits of minerals, gas, and petroleum, it is known to use seismic reflection techniques wherein seismic impulses are initiated at or in the vicinity of the surface of the earth to generate an elastic wave of seismic frequency which is transmitted down through the earth. When the wave encounters a discontinuity in the earth's structure, at least a portion of the energy in the wave will be reflected or refracted and returned toward the surface of the earth. One or more seismic detectors positioned at the earth's surface are used to generate electrical signals responsive to the reception of elastic wave energy, such as is initiated by the seismic impulses. Each seismic detector may receive a number of reflected waves varying both in magnitude and time in accordance with the depth of discontinuities in the earth's structure. The output of each seismic detector in a seismic observation is a substantially sinusoidal electrical signal varying in amplitude with time, with prominent variations in the amplitude of the signal corresponding to the arrival of reflected and refracted seismic waves. A seismogram (a record of a plurality of seismic wave detector output signals) can yield much information relating to a subsurface discontinuity, such as the depth, strike, and dip of the discontinuity.

To improve the speed and accuracy of seismogram analysis, it has been found desirable to use apparatus such as is described in the co-pending application of Frank J. Feagin et al., "Method and Apparatus for Interpreting Geophysical Data," Serial No. 382,588, filed September 28, 1953, now U.S. Patent No. 2,927,656. In this particular patent application there is described apparatus for use in connection with geophysical prospecting wherein intervals of a seismic record are selected for correlation, the portions selected being those that appear to contain coherent components of the seismic signal. In order to determine the time relationship between coherent components of the seismic signals over an interval of the signals, the signals are correlated in accordance with a selected criterion for best fit over the entirety of the selected interval. Determination of best fit involves successive shifting of the time relationship between said traces and correlating the seismic traces over the selected interval for each time relationship. An electrical output signal from the correlation apparatus indicates the degree of correlation; an extreme indication of a meter measuring the electrical signal indicates the time relationship between the seismic traces corresponding to maximum correlation therebetween. In order to determine the optimum time relationship between coherent components in a selected interval of the seismic record, it is necessary to limit the interval to a relatively small segment of the record. The reason for this requirement is that the seismic record considered in its entirety may contain coherent components having more than one optimum time relationship in different sections of the record. In other words, since coherent components of the seismic traces have different time relationships over different intervals of the seismograms, the interval of correlation mentioned above of necessity must be chosen to be over only a small part of the total seismic record.

In correlating seismic signals in accordance with the teaching of patent application Serial No. 382,588, it has been found practicable to continuously carry out the correlation process over an interval of the seismogram as this interval is moved from one end of the seismogram to the other. A preferred type of correlating apparatus for use with this correlation technique reproduces in the form of electrical signals a plurality of previously recorded seismic traces while maintaining a predetermined adjustable time relationship between the signals. The electrical signals are algebraically summed to produce a single signal having an instantaneous value equal to the instantaneous sum of the reproduced electrical signals. The summed signal is thereupon applied to an operational circuit of a type adapted to rectify the summed signal and to emphasize amplitude variations in the summed signal. The output signal of the operational circuit is applied to an integrating circuit to produce an output signal which will be indicative of the degree of correlation between the reproduced electrical signals over the interval of integration. In order to minimize the possibility that the correlation interval will be so long as to include more than one seismic reflection, it is often desirable to make the correlation interval precise and definite.

In accordance with one aspect of the invention, an electrical signal to be integrated over a predetermined interval of fixed duration is coupled to two electrical channels. In one channel the electrical signal is delayed by the interval of fixed duration. The signals in both channels are coupled to a circuit including difference-taking means and integrating amplifier means to derive an output signal indicative of the integral of the difference between the delayed signal and the non-delayed signal. The output signal will be found to be indicative of the integral of the original electrical signal over an interval of fixed duration as this interval is moved from one end of the seismogram to the other.

In a specific embodiment of the invention, a signal representing rectified and amplitude emphasized variations of time-shifted and summed electrical signals derived from phonographically reproducible traces of a seismogram are used to control the frequency of a variable frequency oscillator. The oscillator output signals are separated into two channels, so that the signal in one is delayed in time relative to the other. Rectangular wave pulse trains of constant pulse width and pulse height and having a repetition rate controlled by the frequency of the oscillator output signals in the two channels are derived from the signals in the two channels. An output signal is derived equal to the integral of the difference of the two pulse trains. The output signal will be found to be equal to the integral of the signal controlling the oscillator over the delay interval of the oscillator output signals in the delay channel.

A more complete understanding of the invention may be had with reference to the following description thereof when considered in connection with the accompanying drawings, wherein.

Figure 1:
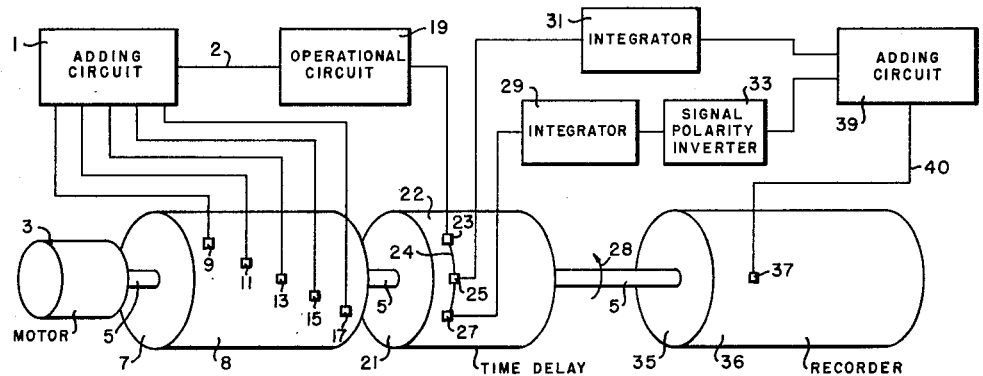
FIG. 1 is a schematic representation of one embodiment of the invention.

With reference now to FIG. 1, there is shown an embodiment of the invention utilizing a drum unit including a plurality of drums 7, 21, and 35 connected to a common drive shaft 5 so as to be driven by electric motor 3. Magnetic tapes 8, 22, and 36 are affixed to the outer surfaces of drums 7, 21, and 35, respectively. The magnetic tapes are of the type adapted for faithful recordation and reproduction of electrical signals by means of suitable magnetic recording and reproducing heads.

Associated with drum 7 and magnetic tape 8 are a plurality of recording and reproducing heads 9, 11, 13, 15, and 17. The number of heads will vary in accordance with the maximum number of geophone output signals to be recorded on tape 8. The magnetic heads are circumferentially adjustable about the periphery of drum 7 so that a predetermined adjustable time relationship between the electrical signals reproduced by the heads may be obtained.

The output signals from magnetic heads 9 through 17 are coupled to an adding circuit 1 to produce a summed output signal on lead 2. Adding circuit 1 is coupled to an operational circuit 19 (such as an amplitude squaring circuit) for rectifying the signal on lead 2 and emphasizing amplitude variations in the signal on lead 2. A preferred operational circuit is the squaring circuit, which rectifies and also emphasizes the amplitude variations in an accepted manner.

The output signals from operational circuit 19 are coupled to head 23 so as to be recorded as a trace 24 on magnetic tape 22. The magnetic recording head 23 and reproducing heads 25 and 27 are positioned around the periphery of drum 22 so that the electrical signal coupled to recording head 23, after being magnetically recorded on magnetic tape 22, will be reproduced by magnetic heads 25 and 27. The positions of all of the heads 23, 25, and 27 may be adjustable relative to each other; however, it is necessary that only one of heads 25 and 27 be circumferentially movable. By suitably positioning heads 25 and 27, an adjustable time relationship may be produced between the signals from the heads.

The output signals from reproducing heads 25 and 27 are coupled to the input circuits of integrating circuits 31 and 29, respectively. Integrating circuits 31 and 29 may be integrating amplifiers of conventional design. The function of integrating circuits 31 and 29 is to produce output signals that are time integrals of the amplitudes of signals coupled to the input circuit thereof. The output signal from integrating circuit 29 is coupled to adding circuit 39 through a signal polarity inverting circuit 33. The output signal from integrator 31 is coupled to adding circuit 39 directly. Inverting circuit 33 must produce an output signal opposite in polarity to the signal produced by integrator 31, which output signal must be a faithful reproduction of the output signal of integrator 29. At any instant, the output signal from adding circuit 39 appearing on lead 40 will be equal to the difference between the signals appearing at the outputs of integrating circuits 31 and 29. This signal may be recorded on magnetic tape 36 by recording head 37.

The operation of the portion of the above-described circuit including reproducing heads 9 through 17, adding circuit 1, and operational circuit 19, is described in Feagin et al. patent application Serial No. 382,588, now U.S. Patent No. 2,927,656. Briefly, the reproduced seismic signals appearing upon the electrical leads from heads 9, 11, 13, 15 and 17 are added together by adding circuit 1 so that the instantaneous amplitude of the signal appearing on lead 2 is equal to the instantaneous sum of the signals coupled to the input circuit of adding circuit 1. Amplitude variations in the circuit appearing upon lead 2 are emphasized by operational circuit 19 and recorded on magnetic tape 22 by recording head 23.

Figure 2:
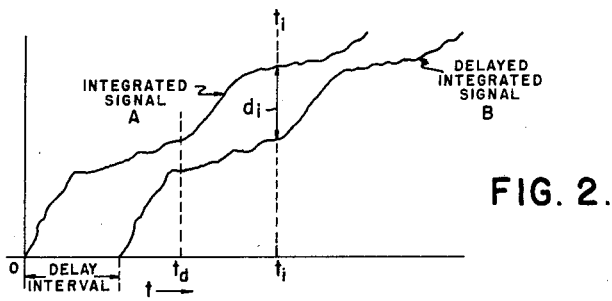
FIG. 2 is a waveform representation of the output signals of the integrator circuits of FIG. 1.

As drum 21 revolves in the direction shown by arrow 28, the signal recorded on tape 22 will be reproduced by reproducing heads 25 and 27. The output signals from reproducing heads 25 and 27 will be the same except for the time delay of the signal from head 27 relative to the signal from head 25, brought about by the spacing of the heads. The signals from heads 25 and 27 are integrated by integrating circuits 31 and 29. In FIG. 2 there is shown a pair of signals that may be produced by means of integrating circuits 29 and 31 from a typical seismogram. Integrated signal A represents a signal that may appear at the output of integrating circuit 31, and delayed integrated signal B represents a signal that may appear at the output of integrator 29. The difference at any given instant in the amplitudes of integrated signals A and B will be the amplitude of the integral of the output signal from operational circuit 19 over the period, prior to the given instant, equal to the chosen delay interval. For example, at any instant $t_1$, the difference $d_1$ in the amplitudes of signal A and signal B represents the integral of the output signal from circuit 19 (i.e., signal A) over the interval from $t_d$ to $t_1$. The output from adding circuit 39 may be recorded on magnetic tape 36 by recording head 37.

A number of changes may be made in the circuitry of FIG. 1 without departing from the scope of the invention. For example, the seismogram may be recorded in variable density form and photoelectric pickup devices may be utilized to reproduce the seismic traces. Furthermore, one of the reproducing heads 25 and 27 may be eliminated and the output of operational circuit 19 may be coupled to the input of integrating circuit 31. The remaining one of heads 25 and 27 will then be coupled to the input of integrating circuit 29. Likewise, a variable density recording system may be used, such as the system described in co-pending application Serial No. 612,608, filed September 28, 1956, by Carl C. Palmer et al. for "Automatic Plotter," now U.S. Patent No. 3,011,856, or the system described in co-pending patent application Serial No. 513,854, filed June 7, 1955, by C. H. Carlisle et al. for "Automatic Plotter," now U.S. Patent No. 2,967,291. Additionally, a mechanical pen-recording system may be utilized to record the output signals on lead 40. If the original seismogram was recorded in variable density form on photographic film, adding circuit 1 may be eliminated by utilizing a light pickup and signal summing system such as is described in U.S. Patent No. 2,144,812 to Frank Rieber.

Figure 3:
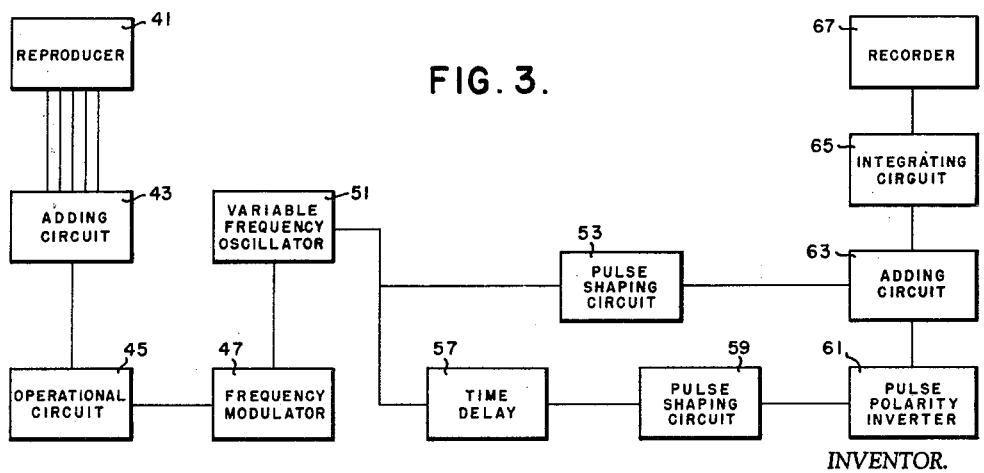
FIG. 3 is a schematic representation of another embodiment of the invention.

Certain elements of the embodiment of the invention shown in FIG. 3 may be the same as corresponding elements in the embodiment depicted in FIG. 1. More specifically, reproducer 41, adding circuit 43, operational circuit 45, and recorder 67 may be the same as the reproducing system, adding circuit, operational circuit, and recorder of FIG. 1. The output signal from operational circuit 45 is coupled to a frequency modulator 47 for modulating the frequency of the output signal of a variable frequency oscillator 51. Frequency modulator 47 may be a reactance circuit of conventional design for frequency modulating a variable frequency oscillator by changing the reactance of the frequency-determining circuit of the oscillator. The circuit constants of frequency modulator 47 and variable frequency oscillator 51 should be such that the output frequency of oscillator 51 varies in accordance with the amplitude of the output signal of operational circuit 45. The output signal of variable frequency oscillator 51 may be sinusoidal.

The output signal of oscillator 51 is directly coupled to pulse-shaping circuit 53, and is coupled to pulse-shaping circuit 59 through a time delay device 57. Time delay device 57 may be a drum delay system such as is described above, or a conventional time delay line utilizing inductive and capacitive elements. The time delay provided by the device 57 should be equal to the interval which is desired to scan along the seismogram.

Pulse-shaping circuits 53 and 59 should produce output signals having the same pulse duration and amplitude. Each of the pulse-shaping circuits may include a monostable multivibrator that is triggered with each change in its sinusoidal input signal from a given polarity to the opposite polarity. The triggering circuit for the multivibrator may comprise a differentiating circuit coupled to the sinusoidal input signal by a half-wave rectifier.

The polarity of the output signal of pulse-shaping circuit 59 is reversed by pulse polarity inverting circuit 61. The output signals of pulse-shaping circuit 53 and pulse polarity inverter 61 are added together by adding circuit 63, and the output signal from adding circuit 63 is integrated by integrating circuit 65. The output signal from integrating circuit 65 is thereupon recorded by recorder 67.

The output pulses from pulse-shaping circuits 53 and 59 will vary in frequency in accordance with the amplitude of the output signal from operational circuit 45. The pulse trains from the two pulse-shaping circuits will be identical, the train from circuit 59 being delayed in time with respect to the pulse train from circuit 53 by an interval determined by time delay means 57. If the amplitudes of the pulses from circuits 53 and 59 were time-integrated individually, and the time integral of the signal from circuit 59 were subtracted from the time integral of the signal from circuit 53 by a suitable difference-taking circuit, the instantaneous value of the output signal of the difference-taking circuit would represent instantaneous value of the integral of the output signal of operational circuit 45 over the time interval, the length of which is equal to the time delay of time delay means 57 as this time interval is scanned over the seismogram from beginning to end. The function of circuits 61 and 63 taken together is to derive a signal indicative of the difference in the amplitudes of the output signals from pulse-shaping circuits 53 and 59, which difference signal is integrated by circuit 65. Since the difference in the integral of two functions is equal to the integral of the difference of the functions, the integral of the difference of the output signals from cricuits 53 and 59 will represent the integral of the output signal of operational circuit 45 over the interval by which the output signal of circuit 59 is delayed by time delay means 57.

The invention is not to be restricted to the specific structural details, arrangement of parts, or circuit connections herein set forth, as various modifications thereof may be effected without departing from the spirit and scope of this invention.

What is claimed is:

1. Apparatus for deriving a continuous output signal indicative of the integral of a primary signal over an interval of predetermined duration of said primary signal comprising: input connector means to which said primary signal is applied; first means having first and second input circuits, adapted to produce said output signal as the time integral of the difference of the amplitude of control signals coupled to said first and second input circuits; and second means coupled to said input connector and to said first and second input circuits adapted to supply pulsed signals to said first and second input circuits of constant pulse width, uniform pulse amplitude, and variable in frequency in accordance with variations in amplitude in said primary signal, said second means being further adapted to delay in time the signal supplied to said second input circuit relative to the signal supplied to said first input circuit by an amount equal to said interval of predetermined duration.

2. Apparatus for correlating a plurality of traces of a phonographically reproducible multiple-trace seismogram comprising: first means for reproducing the traces of said seismogram as electrical signals with a predetermined time delay relationship between the reproduced traces and for algebraically summing said signals; operational circuit means coupled to said first means for generating a signal of a character to rectify and to emphasize amplitude variations in the summed signal from said first means; means for deriving an output signal having a characteristic variable in accordance with the difference of the time integrals of a characteristic of control signals coupled to first and second input circuits thereof, and circuit means coupling said operational circuit means to said first input circuit with a predetermined time delay and to said second input circuit without time delay, said circuit means being adapted to supply said input circuits with control signals, said characteristic of which is variable as a function of the emphasized amplitude variations in said summed signal.

3. Apparatus for deriving a continuous signal indicative of the integral of a primary signal over an interval of predetermined duration of said primary signal comprising: input connector means for receiving said primary signal; adding circuit means having first and second input circuits, and an output circuit for said apparatus; means coupled between said input connector means and said input circuits of said adding circuit means adapted to supply a signal to said first input circuit indicative of the integral of the amplitude of said primary signal, and to supply to said second input circuit a signal of opposite polarity to the signal applied to said first input circuit and indicative of the integral of the amplitude of said primary signal after a time delay equal to said interval.

4. Apparatus for producing an electrical signal at an output connector thereof indicative of the integral over a predetermined interval of an input signal appearing at an input connector thereof, comprising: first circuit means connected to said output connector and having first and second input circuits, said first circuit means being adapted to produce at said output connector an electrical signal variable as the difference of the time integrals of a characteristic of electrical signals coupled to said first and second input circuits; first branch circuit means coupling said input connector to said first input circuit of said first circuit means; and second branch circuit means coupling said input connector to said second input circuit of said first circuit means, adapted to delay the input signal by said predetermined interval so that said input signal will appear at said second input circuit an interval after it appears at said first input circuit equal to said predetermined interval.

5. Apparatus for producing an electrical signal at an output connector thereof indicative of the integral over a predetermined interval of an input signal appearing at an input connector thereof, comprising: first circuit means connected to said output connector and having first and second input circuits, said first circuit means being adapted to produce at said output connector an electrical signal variable as the time integral of the difference of the amplitudes of electrical signals coupled to said first and second input circuits thereof; an electrical oscillator adapted to produce an alternating current output signal of constant amplitude; circuit means coupled to said oscillator and to said input connector adapted to vary the frequency of the output signal from said oscillator as a direct function of the amplitude of the input signal appearing at said input connector; a first branch circuit connecting said oscillator output signal to said first input circuit, said first branch circuit means including means adapted to modify the waveform of the oscillator output signal to produce constant amplitude pulses of unvarying pulse width and having a given polarity; and a second branch circuit connecting said oscillator to said second input circuit, said second branch circuit including time delay means adapted to delay the signals appearing at said second input circuit relative to the signals appearing at said first input circuit by said predetermined time interval, said second branch circuit further including means for modifying the oscillator output signal to produce pulses at said second input circuit having the same amplitude, the same pulse width, and the opposite polarity of the pulses appearing at said first input circuit.

6. Apparatus for producing an electrical signal at an output connector thereof indicative of the integral over a predetermined interval of an input signal appearing at an input connector thereof, comprising: a variable frequency oscillator connected to said input connector and responsive to said input signal to produce a sinusoidal signal having a frequency variable as a direct function of the amplitude of said input signal; first circuit means having first and second input circuits, connected to said output connector and adapted to produce an output signal indicative of the integral of the sum of the signals appearing at said first and second input circuits; a first pulse-shaping circuit connected to said variable frequency oscillator and to said first input circuit responsive to each change in polarity in the output signal of said variable frequency oscillator from a given polarity to the opposite polarity to produce a uni-polarity pulse of given amplitude and duration; time delay means connected to said variable frequency oscillator adapted to delay the output signal of said variable frequency oscillator by said predetermined time interval; circuit means connected to said time delay means and to said second input circuit responsive to each change in polarity in the output signal of said time delay means from a given polarity to the opposite polarity to produce at said second input circuit a uni-polarity pulse of said given duration and amplitude having the opposite polarity from the polarity of the pulses appearing at said first input circuit.

7. Apparatus for producing an electrical signal at an output connector thereof indicative of the integral over a predetermined interval of an input signal appearing at an input connector thereof, comprising: an adding circuit having first and second input circuits and an output circuit, said adding circuit being adapted to produce an output signal indicative of the sum of the electrical signals appearing at said first and second input circuits; time delay means electrically connected to said input connector adapted to produce said input signal at first and second output terminals thereof, the signal appearing at said second output terminal being delayed in time relative to the signal appearing at said first output terminal by an interval equal to said predetermined interval; a first integrator circuit connecting said first output terminal to said first input circuit adapted to integrate the signal appearing at said first output terminal; a second integrator circuit connected to said second output terminal adapted to integrate the signal appearing at said second output terminal; and signal polarity reversing means electrically connecting said second integrator circuit to said second input circuit adapted to reverse the polarity of the output signal from said second integrator circuit appearing at said second input circuit relative to the polarity of the first integrator circuit output signal appearing at said first input circuit.

8. Apparatus for producing an electrical signal at an output connector thereof indicative of the integral over a predetermined interval of an input signal appearing at an input connector thereof, comprising: an adding circuit having first and second input circuits and an output circuit, said adding circuit being adapted to produce an output signal indicative of the sum of the electrical signals appearing at said first and second input circuits; time delay means electrically connected to said input connector adapted to produce said input signal at first and second output terminals thereof, the signal appearing at said second output terminal being delayed in time relative to the signal appearing at said first output terminal by an interval equal to said predetermined interval; a first integrator circuit connecting said first output terminal to said first input circuit adapted to integrate the signal appearing at said first output terminal; and branch circuit means connected to said second output terminal and to said second input circuit of said adding circuit adapted to produce at said second input circuit a signal equal to the integral of the signal appearing at said second output terminal and having the opposite polarity from the signal appearing at said first input circuit of said adding circuit.

9. Apparatus for producing an electrical signal at an output connector thereof indicative of the integral over a predetermined interval of an input signal appearing at an input connector thereof, comprising: an adding circuit having first and second input circuits and an output circuit, said adding circuit being adapted to produce an output signal indicative of the sum of the electrical signals appearing at said first and second input circuits; a first integrator circuit electrically connected to said first input circuit of said adding circuit, adapted to integrate an electrical signal connected thereto; electrical circuit means electrically connected to said second input circuit adapted to integrate an electrical signal coupled thereto to produce an electrical signal at said second input circuit of the opposite polarity from the electrical signal produced at said first input circuit by said first integrating circuit; and coupling and time-shifting means coupling said input connector to said first integrating circuit and to said electrical circuit means to produce a first signal for integration by said integrating circuit means and a second signal for integration by said electrical circuit means with the second signal lagging the first signal by said predetermined interval of time.

10. Apparatus for correlating a plurality of traces of a phonographically reproducible seismogram comprising: first means for reproducing the traces of said seismogram as electrical signals with a predetermined time delay relationship between the reproduced traces, and for algebraically summing said signals; function circuit means coupled to said first means for generating a signal of a character to emphasize amplitude variations in the summed signal from said first means; second means for generating an alternating current signal; third means coupled to said second means and to said function circuit means for frequency modulating said alternating current signal as a function of the amplitude of the output signal of said function circuit means; time delay means coupled to said second means for delaying the output signal of said second means by a time interval of fixed duration; fourth means coupled to said time delay means for deriving a first unipolarity rectangular wave pulse train of fixed pulse amplitude duration, having a repetition rate variable in accordance with variations in the frequency of the output signal of said time delay means; fifth means coupled to said second means for deriving a second unipolarity rectangular wave pulse train having the same pulse amplitude and pulse duration as said first pulse train but opposite in polarity to said pulses in said first pulse train, and further having a repetition rate variable in accordance with variations in the frequency of the output signal of said second means; summing circuit means coupled to said fourth means and to said fifth means for summing said first and second pulse trains; and integrating circuit means coupled to said second summing circuit means for integrating the output signals of said summing circuit means.

References Cited in the file of this patent

UNITED STATES PATENTS

| | | |
|---|---|---|
| 2,643,819 | Lee et al. | June 30, 1953 |
| 2,794,965 | Yost | June 4, 1957 |
| 2,801,351 | Calvert et al. | July 30, 1957 |
| 2,836,359 | Mazzagatti | May 27, 1958 |

OTHER REFERENCES

Review of Scientific Instruments (Brooks et al.), March 1952, pp. 121–126.

Proceedings of National Electronics Conference (George), vol. X, 1954, pages 109–118.

Goff: "An Analog Electronic Correlator for Acoustic Measurements," Journal Acoustical Society of America, vol. 27, No. 2, March 1955, pp. 223–236 (page 224 relied on).